United States Patent
Pollack et al.

[11] 4,045,124
[45] Aug. 30, 1977

[54] BISTABLE DEFLECTION SYSTEM

[75] Inventors: Joel M. Pollack, Rochester; John B. Flannery, Webster, both of N.Y.

[73] Assignee: Xerox Corporation, Stamford, Conn.

[21] Appl. No.: 552,898

[22] Filed: Feb. 25, 1975

[51] Int. Cl.² .................................................. G02F 1/13
[52] U.S. Cl. ........................... 350/160 LC; 350/162 R
[58] Field of Search ..................... 350/160 LC, 162 R

[56] References Cited
PUBLICATIONS

Greubel et al.; "Electrically Controllable Domains in Nematic Liquid Crystals," App. Phys. Lett. vol 19, pp. 213-215, Oct. 1, 1971.

*Primary Examiner*—Edward S. Bauer
*Attorney, Agent, or Firm*—James J. Ralabate; Richard A. Tomlin; George J. Cannon

[57] ABSTRACT

Bistable deflection of a beam of light into and out from a layer of nematic liquid crystalline material having negative dielectric anisotropy and having a thickness of from about 1 micron to about 6 microns is achieved by providing the nematic liquid crystalline material in the parallel variable grating mode between two electrodes, the nematic being under an applied voltage between the two electrodes at a voltage level above the threshold voltage level for parallel variable diffraction mode for said nematic liquid crystalline material, and increasing and decreasing the applied voltage so that light diffracted by the parallel variable grating mode nematic is deflected at an angle which either exceeds or is less than the critical angle between the layer of nematic liquid crystalline material and one of the electrodes. When the deflection of diffracted light is increased in excess of the critical angle, the incident light is totally reflected within the nematic layer; and, when the deflection angle of the diffracted light is decreased below the critical angle, the incident light is diffracted through the nematic layer and the one electrode. The bistable deflection can be utilized in a reproduction device which converts a data chain of electrical signals into an image and in integrated optics.

8 Claims, 4 Drawing Figures

BISTABLE DEFLECTION SYSTEM

BACKGROUND OF THE INVENTION

This invention relates to bistable deflection and, more particularly, to bistable deflection utilizing the parallel variable grating mode domain formation in thin layers of nematic liquid crystalline materials having negative dielectric anisotropy.

Liquid crystal diffraction gratings are known. See, for example, Carroll, *Journal of Applied Physics*, 43, 3 (1972); Greubel and Wolff, *Applied Physics Letter*, 19, 213 (1971). Variable grating mode domains in nematic liquid crystalline materials as distinguished from the Williams domains were denoted as such by Penz and Ford, *Physical Review A*, 6, 414 (1972) and studied by Greubel and Wolff. The Greubel and Wolff studies showed that the domains in the variable grating mode were formed in a direction perpendicular to the initial homogeneous alignment of the nematic liquid crystalline material. This alignment is hereinafter referred to as the perpendicular variable grating mode.

U.S. Pat. Nos. 3,758,195 and 3,813,145 to Hedman et al. are directed to information display apparatus utilizing as a diffraction grating a cell containing a liquid crystalline material. It is believed that, at least in some instances, the diffraction results reported in these patents inherently resulted from a variable grating mode nematic liquid crystalline material having negative dielectric anisotropy and that, in some instances, the long axes of the domains in the variable grating mode were parallel to the initial homogeneous alignment (hereinafter referred to as parallel variable grating mode) rather than perpendicular as reported in the Greubel and Wolff article.

In new and growing areas of technology such as liquid crystal technology, new methods, apparatus, compositions, and articles of manufacture are often discovered for the application of the new technology in a new mode. The present invention relates to a novel bistable deflection system utilizing the parallel variable grating mode in nematic liquid crystalline materials.

SUMMARY OF THE INVENTION

It is, therefore, an object of this invention to provide a novel method for providing bistable deflection of incident light.

It is another object of this invention to provide selective reflection of incident radiation within a layer of nematic liquid crystalline material.

It is a further object of this invention to provide a novel device for reproducing an image from a data chain of electrical signals.

The foregoing objects and others are accomplished in accordance with this invention by providing between two electrodes, an about 1 to about 6 micron thick layer of homogeneously aligned nematic liquid crystalline material having negative dielectric anisotropy; applying a d.c. voltage between said two electrodes at or above the parallel variable grating mode voltage level for the nematic liquid crystalline material; illuminating said layer of nematic liquid crystalline material in the parallel variable grating mode with a beam of light; and increasing or decreasing the applied d.c. voltage above the voltage level for parallel variable diffraction mode formation wherein diffracted light is deflected at an angle greater than or less than the critical angle existing between the nematic liquid crystalline layer and one of the electrodes. The phrase "critical angle" is used herein to mean a fixed angle $\phi_c$ in excess of which diffracted light is totally reflected within the nematic layer where $\sin \phi_c = n/n'$, wherein $n$ is the total optical index of refraction for the electrode of interest and $n'$ is the optical index of refraction for the nematic liquid crystalline material.

BRIEF DESCRIPTION OF THE DRAWINGS

For a better understanding of the invention, as well as other objects and further features thereof, reference is made to the following detailed disclosure of the preferred embodiments of the invention taken in conjunction with the accompanying drawings thereof, wherein.

DESCRIPTION OF THE PREFERRED EMBODIMENTS

Figure 2:
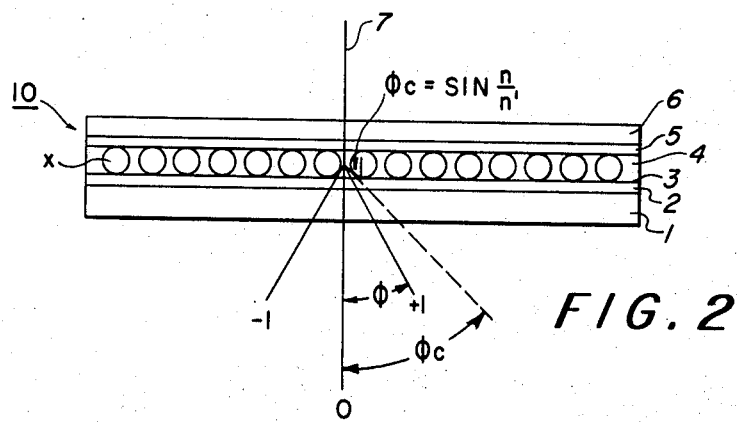
FIG. 2 is a partially schematic illustration of bistable deflection provided in accordance with the practice of the present invention.

Referring now to FIG. 2, there is seen a bistable deflector comprising substrates 1 and 6, conductive coatings 2 and 5, and layer 4 of nematic liquid crystalline material having negative dielectric anisotropy.

The substrates 1 and 6 can comprise any suitable electrically insulating substrate. Typical suitable electrically insulating substrate materials include glass, plastic, ceramics and other electrically insulating materials. Substrates 1 and 6 are transmissive or semi-transmissive to the incident light 7. Conductive coatings 2 and 6 can comprise any suitable electrically conductive material. Typical suitable electrically conductive materials include gold, indium oxide, tin oxide, silver, chrome and other conductors. Conductive coatings 2 and 5 are sufficiently thin so as to be transmissive to light 7.

For purposes of illustration incident light 7 is shown impinging substrate 6 in a direction orthogonal to the plane of substrate 6. This direction is shown in FIG. 2 for purposes of clarity and it will be understood that incident light 7 can be directed to impinge substrate 6 at any angle at which total reflection of light 7 from the air-substrate 6 interface does not occur. It will also be understood that some refraction of light 7 will occur when it is directed at an angle other than orthogonal to the plane of substrate 6; however, the practice of the present invention is not thereby prevented. Incident light 7 passes through substrate 6 and conductive coating 5 to layer 4 of nematic liquid crystalline material in the parallel variable grating mode. In passing through this mode of layer 4, incident light 7 is diffracted into orders of light. For purposes of clarity, only the zero-order and the +1 and −1 orders of diffracted light are shown. However, it will be understood to others skilled in the art that a plurality of orders of diffracted light to typically provided when the phenomena of light diffraction occurs. Further, it will be noted that angle $\phi_0$ exists between the zero-order light and the +1 and −1 orders of light. The relationship between the diffraction angle and the spatial frequency of the liquid crystal grating is given by the Bragg relationship, $n\lambda = d \sin \phi$, where $n$ is the order of diffraction, $\lambda$ the wavelength of light and $d$ the domain width. While this is shown, for convenience, to exist between the +1 order and zero-order of light in FIG. 2, it will be appreciated by those skilled in the art that each positive and negative order of diffracted light makes an angle with the zero-order of light. Further, when light 7 is incident in a direction orthogonal to the plane of substrate 6 the angle is made by the +1 and −1 diffracted orders of light are equal, the angles mde by the +2 and −2 orders of diffracted light are equal, and so forth. As is also known to those skilled in the art, when incident light 7 is in a direction orthogonal to the plane of layer 6 the intensity of light in the +1 order of diffracted light is equal to the intensity of light in the −1 order of diffracted light, the intensity of light in the +2 order of diffracted light is equal to the intensity of light in the −2 order of diffracted light, and so forth. Further, as is known to those skilled in the art, when light 7 is otherwise angularly incident upon substrate 6, (but not deflected from substrate 6), the zero order light passes through substrate 1 at an angle and is not orthogonal to the plane of the substrate 1; and, light intensity is not evenly distributed between the positive and negative orders of diffraction.

Figure 1:
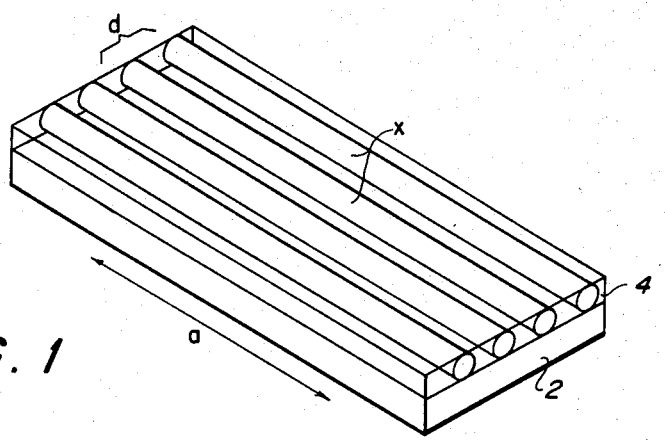
FIG. 1 is a partially schematic illustration of the parallel variable grating mode domains utilized in the practice of the present invention.

Layer 4 of nematic liquid crystalline material is depicted in FIG. 2 as being in the parallel variable grating mode and as having parallel, vortical domains $x$ with the long axes of domains $x$ being orthogonal to the plane of the FIG. 2 drawing. The parallel variable grating mode is a voltage threshold phenomenon in that each thin (1 to 6 micron) layer of dielectrically negative nematic exhibits the parallel mode at and above a particular level of voltage specific to the nematic employed. A description of the parallel variable grating mode is best made in conjunction with FIG. 1. Referring now to FIG. 1, there is seen conductive coating 2 upon which resides layer 4 of nematic liquid crystalline material having negative dielectric anisotropy. The direction $a$ is the direction of zero-field homogeneous alignment in which the nematic liquid crystalline material is initially placed, and the rod-shaped domains $x$ represent tubular, vortical domains of the liquid crystalline material which are exhibited when the liquid crystalline material is in the parallel variable grating mode. The long or major axes of $x$ are parallel to the $a$ direction. The vortical domains are believed to be formed due to the combined action of the applied d.c. voltage and charge injection upon the nematic liquid crystalline layer 4. It is further believed that the net effect of th combined action results in a torque which results in vortical movement of the nematic liquid crystalline material. It has been observed that adjacent vortical domains thus formed in layer 4 rotate in opposite directions. The distance $d$ between adjacent vortical domains and the size of the vortical domains have been found to vary in width inversely with the magnitude of the applied d.c. voltage. That is, with an increase in applied d.c. voltage the size of adjacent domains and the distance therebetween decreases whereas with decreasing d.c. voltage the size of the vortical domains and the distance therebetween increases. Therefore, the spatial frequency of the resulting grating increases with increasing voltage level and decreases with decreasing voltage level. Spatial frequencies from about 125 to more than 2000 domains per millimeter have been obtained.

As is well known to those skilled in the art, for a given wavelength of incident radiation the angle of diffraction for any given order of diffracted light away from the zero order is related to the spatial frequency of the diffraction grating. Hence, in the bistable deflector of the present invention, higher voltage levels result in a higher spatial frequency which, in turn, results in a greater angle of diffraction from the zero-order for any given order of diffracted light.

Referring again to FIG. 2, it will now be appreciated that if the voltage level applied between conductive coatings 2 and 5 is at the level where a given order of diffracted light is just below the critical angle for total reflection within the nematic layer 4, that a subsequent relatively small increase in the voltage applied between conductive coatings 2 and 5 will increase the angle of diffraction from the zero-order in excess of the critical angle and thereby cause that given order of diffracted light to now be totally reflected within layer 4. Conversely, if the voltage level applied between conductive coatings 2 and 5 is already at the level at which the critical angle for a given order of light is exceeded (that order of light now being totally reflected within layer 4) then a relatively small decrease in the voltage applied between conductive coatings 2 and 5 will result in that given order being diffracted out from layer 4 through conductive coating 2 and substrate 1 and at a degree of diffraction from the zero-order light which is below the critical angle. It will be understood by those skilled in the art that irrespective of the direction of disposition of incident light 7 with respect to the plane of substrate 6, the critical angle $\phi_c$, where $\sin \phi_c = n$ divided by $n'$, is measured as the angle between and orthogonal to the interface 3 between conductive coating 2 and nematic layer 4 and the direction of the diffracted order of interest. The incident light 7 can comprise any suitable light, whether monochromatic or polychromatic, and whether coherent or incoherent. The incident light 7 is preferably not absorbed to any substantial degree by the liquid crystalline material in nematic layer 4. Where incident light 7 is polychromatic, light of longer wavelengths are diffracted to a greater degree from zero-order light than light of shorter wavelength and, therefore, the light of longer wavelength will reach the critical angle with steadily increasing d.c. voltage at a lower d.c. voltage level than light of shorter wavelength. The applied d.c. voltage may be applied at a level at which the spatial frequency causes the light of shortest wavelength contained in the polychromatic light 7 to exceed the critical angle and thereby insure that all wavelengths of light in the polychromatic source are totally reflected within nematic layer 4. On the other hand, the d.c. applied voltage can be selectively adjusted to any given value which will cuase one or more wavelength of light contained in incident polychromatic light 7 to diffract in excess of the critical angle and thereby be totally reflected within layer 4 while the remaining wavelengths of light are diffracted by layer 4 through conductive coating 2 and substrate 1. Therefore, for a given (a) thickness of nematic layer 4, (b) wavelength of incident light 7, (c) conductive coating, and (d) nematic liquid crystalline material in layer 4; there is a critical d.c. voltage level at which the angle of diffraction of the given wavelength of incident radiation exceeds the critical angle. That voltage, for a given wavelength of light, is herein denoted as the critical angle voltage for that wavelength of light. That is, at or above the critical angle voltage the given wavelength of light will be internally reflected within nematic layer 4 and below the critical angle voltage that wavelength of light will be diffracted through nematic layer 4.

The bistable deflector can be made by any of the techniques commonly used in the liquid crystalline electro-optic device art since the bistable deflector has in common with that art the layer of liquid crystalline material sandwiched between two electrodes. The primary difference between the device utilized in the present invention and the prior electro-optic liquid crystalline devices is that the thickness of nematic layer 4 should be substantially uniform and within the range from about 1 micron to about 6 microns; the nematic liquid crystalline material used in nematic layer 4 must have negative dielectric anisotropy; the nematic liquid crystalline material in the absence of an applied d.c. voltage should be substantially uniformly aligned in the homogeneous texture of the nematic mesophase; and the nematic layer 4 must be subjected to a d.c. voltage applied between the two conductive electrodes which is sufficient to form the parallel variable grating mode in the nematic liquid crystalline material utilized.

Any suitable nematic liquid crystalline material having negative dielectric anisotropy can be employed in nematic layer 4. Typical suitable nematic liquid crystalline materials having negative dielectric anisotropy include: N-(p-methoxybenzylidene)-p'-butylaniline (MBBA); p-azoxyanisole (PAA), N-(p-ethoxybenzylidene)-p'-butylaniline (EBBA); d-l-4-(2-methylhexyl)-4'-ethoxy-α-chloro-trans-stilbene; p-methoxy-benzylidene-p'-aminophenyl-3-methylvalerate (MBV); p-ethoxybenzylidene-p'-aminophenyl-3-methylvalerate; pp'-methoxypenyltolane (MPT); pp'-propoxyheptyltolane (PHT); pp'-dioctoxytolane (DOT); trans-4-butyl-α-chloro-4'-ethoxystilbene and Phase IV and Phase V nematic liquid crystalline phases available under the trademark Licristal from E. M. Laboratories, Inc. Phase IV is a eutectic mixture of

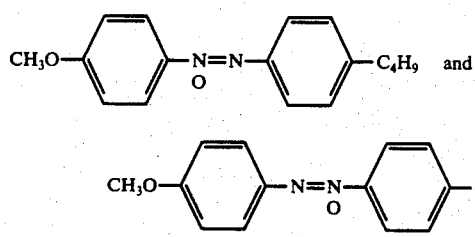

phase V is a mixture of Phase IV and the eutectic mixture of

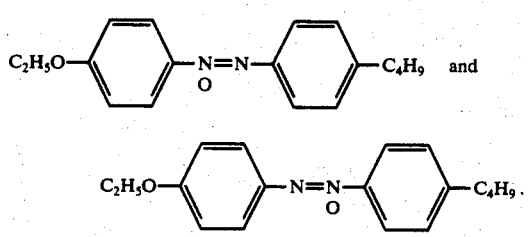

Typically spacers are included in device construction to separate the conductive coatings 2 and 5 and to provide the space which is to be occupied by nematic layer 4. Such spacers are typically chemicaly inert, transparent, substantially insulating and have appropriate dielectric characteristics. Typical suitable materials utilized for spacers include: cellulose acetate, cellulose triacetate, cellulose acetate butyrate, polyurethane elastomers, polyethylene, polypropylene, polyesters, polystyrene, polycarbonate, polyvinylfluoride, polytetrafluoroethylene, polyethylene terephthalate, and mixtures thereof. It is preferred to utilize vacuum evaporate metals which are vacuum evaporated upon one of the substrates 1 and 6 in regions not mutually covered by electrodes 2 and 5. Such metals include gold, copper, silver, aluminum, chrome and other suitable vacuum evaporative metallic material. These materials are typically placed in a tantalum boat contained in a vacuum evaporator which has been evacuated to about $5 \times 10^{-5}$ torr. Vacuum evaporative metallic posts are preferred because the evaporating process provides a much greater degree of uniformity in spacer thickness than has traditionally been provided by sheet materials; and, the substantial uniformity of spacer thickness results in diffraction efficiencies as high as about 90%.

After the spacers are provided on one of the electrodes, the electrode is treated, inducing the nematic liquid crystalline material in layer 4 to become homogeneously aligned.

Any technique for providing homogeneous alignment of the nematic liquid crystalline material in layer 4 can be utilized and, with the exercise of care, substantially uniform homogeneous alignment can be achieved. Typical suitable homogeneous alignment techniques include the classical technique of rubbing the substrate as disclosed in P. Chatelain, Bull. Soc. Franc. Min. Crist., 66, 105 (1943); providing a coating of aligning agent in contact with layer 4 of nematic liquid crystalline material such as, for example, one of the homogeneous aligning agents listed in Vol. 61, No. 7, Proceedings of the IEEE, p. 823, July, 1973 in the article "Surface-Produced Alignment of Liquid Crystals" by Kahn, Taylor and Schonhorn; and the so-called Janning Technique described by J. L. Janning in Appl. Phys. Letts., 21, 173 (1972).

After treatment of both of the electrodes, the two electrodes are brought into spaced relationship and separated by the vacuum evaporated spacers. The peripheral opening is epoxied lightly at several points with a fast drying epoxy resin available from the Dexter Corporation under the name Epoxy Patch. The cells are then filled with the nematic liquid crystalline material by capillary action. In use, the conductive coatings 2 and 5 are provided with suitable leads which are electrically connected to a suitable source of d.c. voltage.

EXAMPLES I-IV

Four cells having nematic layer thicknesses of about 3.7 microns, 4.0 microns, 4.7 microns and 7.4 microns are prepared as follows. Eight commercially available flat glass plates overcoated with optically transmissive indium oxide coatings and having dimensions of about $2 \times 2 \times \frac{1}{4}$ inch. Each of the indium oxide coatings are selectively etched to provide a circular active area of about 1 cm², rigorously cleaned in a bath of dichromic acid and then subjected to ultrasonic cleaning followed by rinsing in highly filtered, distilled water. Four of the plates are placed in a vacuum evaporator and provided on the activation electrode side with four spacers in regions exclusive of the active area. The spacers comprise a first vacuum evaporated layer of chrome having a thickness of about 50 angstroms and, on top of the chrome, a vacuum evaporated coating of silver sufficient to provide the desired nematic layer thicknesses. Each of the remaining four plates is provided with a coating of silicon monoxide on top of each electrode in accordance with the previously referred to Janning Technique, providing a coating which will homogeneously align nematic liquid crystalline materials. The four cells having desired nematic layer thicknesses are then formed by utilizing, for each cell, one plate provided with spacers and both plates provided with the silicon monoxide coating. The two plates are brought into spaced relationship, separated by the vacuum evaporated spacers and with the silicon monoxide coating in opposed mutual alignment and the active area of one plate aligned in relationship to the active area of the second plate. The nematic liquid crystalline Phase V available under the trademark Licristal from E. M. Laboratories, Inc. is placed in each of the four resulting cells by capillary action.

Figure 3:
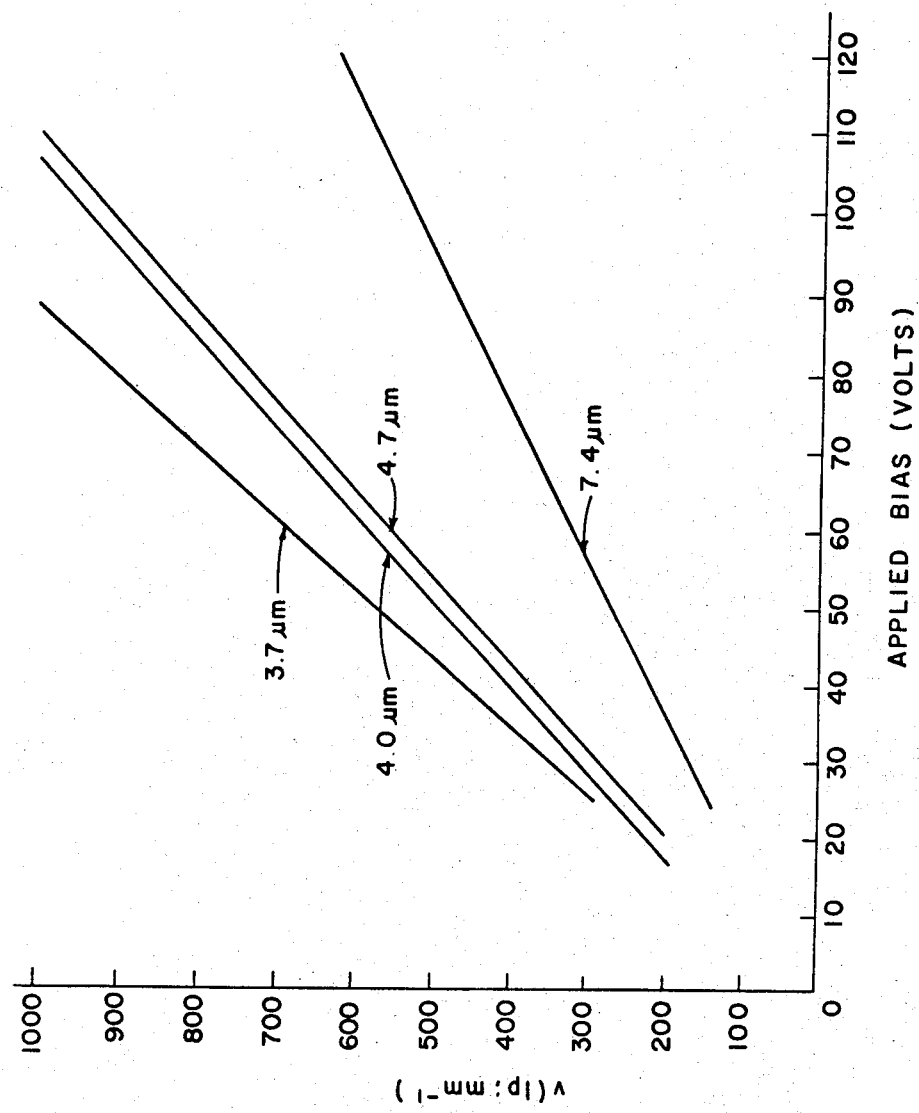
FIG. 3 is a graphical illustration of the variation in domain density as a function of applied voltage for various layer thicknesses of a particularly preferred nematic liquid crystalline material.

Each of the four cells is investigated for spatial frequency as a function of voltage. The data obtained is shown in FIG. 3.

A helium-neon laser emitting radiation at a wavelength of about 6,328 angstroms (6.328 $\times$ $10^{-4}$mm) is positioned to impinge upon the cell in a direction orthogonal to the plane of the first glass plate it encounters. Total internal reflection was observed at about 85 volts for the cell having a nematic layer of about 3.7 microns in thickness; total internal reflection was observed at about 105 volts for the cell having a nematic layer of about 4 microns in thickness; total internal reflection was observed at about 110 volts for the cell having a nematic layer of about 4.7 microns in thickness; and, total internal reflection was not observed in the cell having the about 7.4 micron thick nematic layer because turbulent hydrodynamic motion (DSM) occurred in the cell prior to achieving total internal reflection. This demonstrates that the parallel variable grating mode provides a sufficient degree of diffraction to surpass the critical angle because, under steady state conditions, parallel variable grating mode exists only in the three thinner cells and not in the cell having a nematic layer of about 7.4 microns in thickness. The latter cell, under steady state, exhibits perpendicular variable grating mode where the domains are orthogonal to the homogeneous alignment.

From the Bragg relationship the degree of diffraction for any given order away from the zero order can be calculated; and, from the previously given critical angle formula the angle at which total internal reflection occurs can be calculated. The calculated values compare favorably to one another and to the observed experimental results.

EXAMPLES V–VIII

Optical characterizations of the four cells were obtained as follows. Polarized microscopy confirmed that uniform homogeneous alignment was obtained in the zero-field state over the entire electrodes cell area. A threshold voltage of about 10 volts d.c. was noted for all cells. The threshold voltage noted is the amount of voltage required to be applied prior to observation of any domains in the liquid crystal cell. The cells with nematic layers of about 3.7 microns, 4.0 microns and about 4.7 exhibited domains, the major axes of which were parallel to the initial homogeneous rubbing direction. Immediately upon application of the threshold field, the perpendicular variable grating mode was momentarily observed and almost immediately switched to the parallel variable grating mode. In the cell with the about 4.7 microns thick nematic layer, upon application of the threshold voltage the cell briefly exhibited perpendicular variable grating mode but switched to the parallel variable grating mode and exhibited a preference for the parallel mode under steady state conditions. However, the about 4.7 micron thick cell, after a rest period of about 2 days, would initially exhibit the perpendicular variable grating mode under steady state conditions and then revert to the parallel variable grating mode with use.

The cell with the about 7.4 micron nematic layer exhibited a preference under steady state conditions of applied threshold voltage for the perpendicular variable grating mode. That is, it exhibited the classical variable grating mode reported by Greubel and Wolff. The about 7.4 micron thick nematic layer would momentarily go into the parallel variable grating mode during extended use.

Accordingly, it is concluded that the about 4.7 micron thick cell and the about 7.4 micron thick cell bracket the thickness limit for cells displaying the grating mode in that the thicker cell shows a steady state preference for the perpendicular variable grating mode and the thinner cell shows a steady state preference for the parallel variable grating mode.

Other observations in Examples V–VIII include: the domain patterns in both parallel and perpendicular variable grating mode was stationary at a fixed voltage at or above threshold voltage, but with increasing voltage the width of the individual domains decreases. The perpendicular variable diffraction mode (thicker) cell exhibited dynamic scattering at voltages somewhat above threshold; whereas, for the parallel variable grating mode (thin) cells, the width of the individual domains continued to diminish for voltages up to the level for electrical breakdown.

Figure 4:
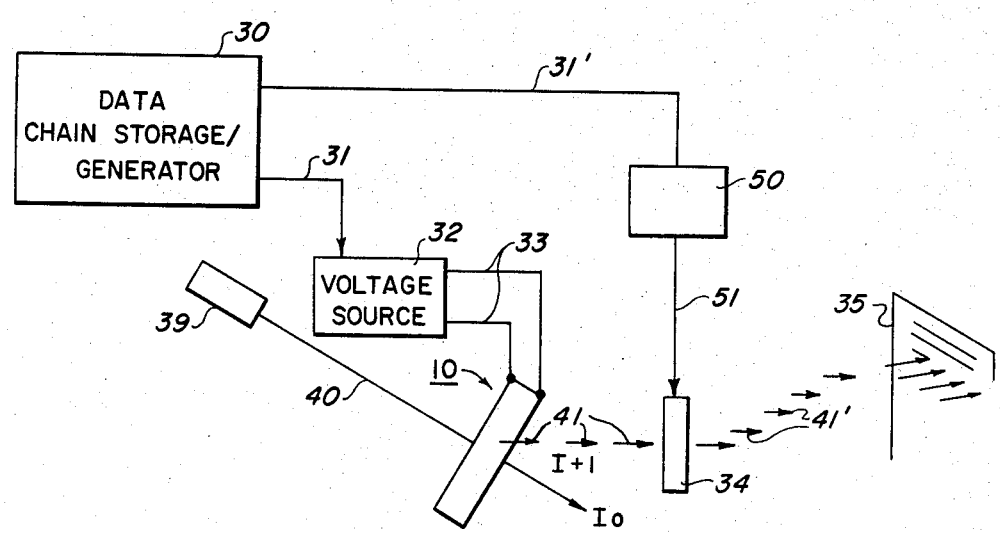
FIG. 4 is a schematic illustration of a reproduction utilizing the bistable optical deflector.

Referring now to FIG. 4, there is seen a data chain generator 30, a variable voltage source 32, bistable deflector 10, a raster deflector 34, a deflector driver 50, and photosensitive imaging member 35. Data chain generator 30 may comprise any source of data chain which controls the magnitude of voltage provided by variable voltage source 32 across the bistable deflector 10. For example, data chain generator 30 can comprise a computer memory in which the magnitude elements are either "on" or "off" as the result of an original document scan. The computer memory activates an electrical pulse generator for each "on" magnetic element and constitutes means for generating a data chain. The data chain 31 is electrically connected to variable voltage source 32. Variable voltage source 32 is adjusted to provide a voltage across bistable deflector 10 which exceeds the critical angle voltage for the wavelength of light 40 whenever it receives an electrical signal from data chain 31; and, variable voltage source 32 is adjusted to provide a voltage across bistable deflector 10 which is less than the critical angle voltage for the wavelength of light 40 but above the parallel variable grating mode threshold voltage level in the absence of an electrical signal from data chain 31. Light source 39 is preferably a source of monochromatic light 40, such as a laser. In accordance with the change in voltage applied across bistable deflector 10 radiation 40 will either be diffracted through bistable deflector 10 as light pulse 41 or will be totally internally reflected within the layer of nematic liquid crystalline material and exit bistable deflector 10 in the plane of the nematic liquid crystalline layer. Raster deflector 34 can comprise any typical suitable scanning element such as, for example, rotating mirrors, acousto-optical deflectors and piezoelectric deflectors. The deflector driver 50 receives a synchronization signal 31' from data chain generator 30, this causes the driver 50 to operate the scanning element 34 to redirect, in coincidence with 30, light pulses 41 as pulses 41' to the appropriate position on photosensitive display 35 corresponding to the original document. Photosensitive member 35 can comprise any suitable photosensitive material such as, for example, the photoconductive materials well known to the xerographic art and the silver halide emulsions well known to the photographic art. Scanning member 34 is preferably identical to the scanning element used in scanning the original document to generate the data chain for computer storage.

While the invention has been described in detail with respect to certain embodiments thereof, it is not intended to be limited thereto, but rather it will be appreciated by those skilled in the art that modifications and variations are possible which are within the spirit of the invention and the scope of the claims. For example, while the FIG. 4 embodiment has been described with respect to computer storage of a data chain generated by an original document scan, it will be appreciated that the original document scan and the generation of a copy utilizing the bistable deflector can occur simultaneously in a synchronized manner.

Another particularly suitable utilization of the bistable deflection provided by the practice of the present invention is as a waveguide coupler.

Using a negative nematic liquid crystalline material of index of refraction $n_1$ and two pieces of well cleaned electroded glass with transparent electrodes having an index of refraction $n_2$, where $n_1 > n_2$, a bistable deflector and waveguide is made by providing a small discontinuity (electrical separation) across one electrode. To one side of the discontinuity the sandwiched structure is a bistable deflector provided with electrical connection to a suitable voltage source and to the other side of the discontinuity the sandwiched structure is a waveguide.

With voltage exceeding the critical angle voltage applied across the nematic liquid crystalline material, monochromatic light through the top electrode of the deflector (and preferably only one order of diffracted light) is diffracted at an angle $\theta_1$ such that $\theta_1$ exceeds the critical angle $\phi_c$ for internal reflection; and, reflects from the bottom electrode into the waveguide portion of the structure. By adjustment of voltage applied, the angle $\theta_1$ can be varied to a value which satisfies the conditions for waveguide mode of light propagation, reported by P. K. Tien, "Light Waves in Thin Films and Integrated Optics, Vol. 10, No. 11, *Applied Optics*", p. 2395 (1971) as:

$$2kn_1 W \cos\theta_1 - 2\Phi_{10} - 2\Phi_{12} = 2m\pi;$$

where $W$ is waveguide film thickness (our liquid crystalline layer), $m = 0, 1, 2, 3, \ldots$ etc. is the order of the waveguide mode, $k = W/c$, where $W$ is the angular frequency of the light wave and $c$ is the speed of light in a vacuum; and $2\Phi_{12}$ and $2\Phi_{10}$ are phase shifts at upper and lower film boundaries, respectively, where:

$$\tan\Phi_{12} = n_1^2 (n_1^2 \sin^2\theta_1 - n_2^2)^{1/2} /(n_2^2 n_1 \cos\theta_1)$$

$$\tan\Phi_{10} = n_1^2 (n_1^2 \sin^2\theta_1 - n_0^2)^{1/2} /(n_0^2 n_1 \cos\theta_1)$$

for TM waves.

There are a family of solutions to the first equation for various values of $W$ and $\theta_1$; and, at one value of $W$ there are several values of $\theta_1$ which are solutions to the equation. Therefore, the deflector portion can be used not only to couple waves into the waveguide portion but also to select particular modes and to correct for temporal variations in W.

It will be noted that when the Janning Technique rather than the Chatelain Technique is used to provide zero-field homogeneous alignment the value of $n_2$ is then given by the index of refraction of the coating. Therefore, a coating which gives $n_1 > n_2$ is selected.

What is claimed is:

1. A method for selectively reflecting light of a given wavelength, λ, within a layer of nematic liquid crystalline material, comprising:
   a. providing, between two transparent electrodes, an about 1 micron to about 6 micron thick layer of homogeneously aligned nematic liquid crystalline material having negative dielectric anisotropy;
   b. transmitting through at least one of said two electrodes light comprising said light of wavelength, λ; and
   c. applying a d.c. voltage, between said two electrodes, at least at the parallel variable diffraction mode voltage threshold for said nematic liquid crystalline material wherein vortical domains of said liquid crystalline material are formed in a direction parallel to the direction of initial homogeneous alignment, said domains being substantially parallel one to the other and having a spatial frequency dependent upon the magnitude of said d.c. voltage, said d.c. voltage being above the critical angle voltage level for said light of wavelength, λ, wherein said spatial frequency is sufficient to totally internally reflect said light of wavelength, λ, within said layer of liquid crystalline material.

2. The method of claim 1 further including the step (d) of decreasing said applied d.c. voltage to a level below the critical angle voltage level diffraction mode voltage threshold for said nematic liquid crystalline material.

3. The method of claim 2 wherein said steps (c) and (c) are performed in response to a data chain, further including the step of impinging a photosensitive imaging member with at least some of the light of wavelength λ which is transmitted through the other of said two transparent electrodes during step (d).

4. The method according to claim 1 wherein said light comprising said light of wavelength λ is polychromatic.

5. The method according to claim 1 wherein said nematic liquid crystalline material comprises a mixture of the eutectic mixture of

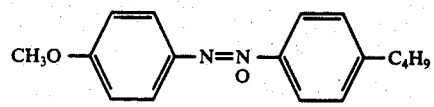

and

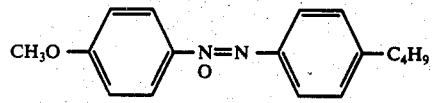

and the eutectic mixture of

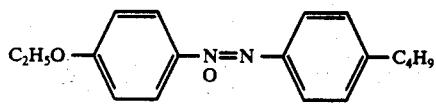

and

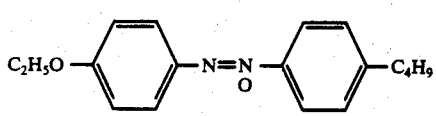

6. The method according to claim 5 wherein said light of wavelength λ is red.

7. The method of claim 6 wherein said transparent electrodes comprise indium oxide.

8. An imaging device, comprising:
a. a photosensitive imaging member capable of forming a latent image in response to light of wavelength λ and a source of light comprising light of wavelength λ;
b. between said photosensitive imaging member and said source of light, a bistable deflector comprising, between two transparent electrodes, an about 1 micron to about 6 micron thick layer of homogeneously aligned nematic liquid crystalline material having negative dielectric anisotropy;
c. voltage means for applying a d.c. voltage between said two electrodes at least at the parallel variable diffraction mode voltage threshold for said nematic liquid crystalline material wherein vortical domains of said liquid crystalline material are formed in a direction parallel to the direction of initial homogeneous alignment, said domains being substantially parallel one to the other and having a spatial frequency dependent upon the magnitude of said d.c. voltage, said voltage means in response to an electrical pulse increasing the voltage level to at least the critical angle voltage for said light of wavelength λ wherein said spatial frequency is sufficient to totally internally reflect said light of wavelength λ within said layer of liquid crystalline material, and in the absence of an electrical pulse decreasing the voltage level to below said critical angle voltage wherein said spatial frequency is insufficient to totally internally reflect said light of wavelength λ within said layer of liquid crystalline material but is sufficient to diffract said light of wavelength λ through said layer of liquid crystalline material and said electrodes; and
d. scanning means for directing, at predetermined positions upon said photosensitive member, light of wavelength λ passing through said bistable deflector.

* * * * *